United States Patent [19]

Grim

[11] Patent Number: 5,366,128
[45] Date of Patent: Nov. 22, 1994

[54] CROSSBAR SUPPORT FOR VEHICLE ROOF RACK

[75] Inventor: Michael Grim, Arcata, Calif.

[73] Assignee: Yakima Products, Inc., Arcata, Calif.

[21] Appl. No.: 147,371

[22] Filed: Nov. 5, 1993

[51] Int. Cl.⁵ .............................................. B60R 9/00
[52] U.S. Cl. .................................... 224/330; 224/329; 224/322
[58] Field of Search ............... 224/329, 330, 331, 322, 224/309, 325, 326

[56] References Cited

U.S. PATENT DOCUMENTS

| | | | |
|---|---|---|---|
| 3,064,868 | 11/1962 | Treydte | 224/331 |
| 4,688,706 | 8/1987 | Thulin | 224/329 |
| 4,877,169 | 10/1989 | Grim. | |
| 5,104,020 | 4/1992 | Arvidsson et al. | 224/329 |
| 5,119,980 | 6/1992 | Grim et al. | |

Primary Examiner—Linda J. Sholl
Attorney, Agent, or Firm—Townsend and Townsend Khourie and Crew

[57] ABSTRACT

A device for supporting the crossbar of a vehicle roof rack and for clamping to the vehicle roof is constructed of a pedestal with a curved ramp, a follower which engages the curved ramp and is mounted to the pedestal in a movable manner, a clip (clamping element) pivotally mounted to the pedestal through the follower, and a manually operated lever arm pivotally mounted to the clamping element. The curved ramp permits the pedestal and clip combination to apply a force with substantially equal vertical and horizontal components to the vehicle, and to maintain these components at a 1:1 ratio throughout the range of motion of the lever arm which tightens the clip and pedestal down onto the vehicle.

8 Claims, 4 Drawing Sheets

CROSSBAR SUPPORT FOR VEHICLE ROOF RACK

This invention relates to vehicle roof accessories, and more particularly to carrier racks designed for mounting to the roofs of vehicles such as automobiles to support cargo or recreational equipment.

BACKGROUND OF THE INVENTION

Roof racks for automobiles are available in numerous varieties, variously adapted to particular roof shapes or the types of load to be supported. A critical feature of all such racks is that they be attached to the roof in a secure manner which is not susceptible to loosening and disengagement when the vehicle encounters road surface deviations or sudden stops and starts. Securement to the roof is generally achieved by clamping elements which clip to the door frames on either side of the vehicle, pressing the rack pedestals down on the roof surface. Typical automobile roofs, of course, are made of thin sheet metal which does not support much force and are sometimes dented when clamping elements are tightened.

The risk of denting the roof as well as the risk of disengagement of the rack are due in part to the magnitudes and directions of the forces exerted by the pedestals and by the clips which secure the pedestals to the roof. The force exerted by each pedestal and its clip has a horizontal component and a vertical component. The horizontal component is borne primarily by the clip and is inwardly directed, i.e., toward the opposing clip, securing the rack to the roof by compressing the roof between the two clips. The vertical component compresses the pedestal down on the roof surface while pulling upward on the clip. The ratio of these components is important in maintaining a secure attachment. If the horizontal component is too great relative to the vertical component, the rack will have a tendency to slide along the vehicle roof longitudinally relative to the vehicle. If the vertical component is too great relative to the horizontal component, the risk of denting the roof is greatly increased. For both a minimal risk of roof damage and a minimal risk of sliding, the optimal ratio of vertical to horizontal force is 1:1.

Since many vehicles have roofs with curved edges, it is difficult to design a single pedestal and clip arrangement which will provide a secure yet damage-free attachment to the roof, and which can be adjusted to accommodate different angles and radii of curvature. It is particularly difficult to design a pedestal and clip combination which will maintain a constant ratio of the vertical to horizontal force components throughout the range of clamping, i.e., over the range of length adjustment of the clip relative to the pedestal. Pedestal and clip arrangements of the prior art in fact have ratios which range from about 1:1 to about 6:1 or 7:1. This severely limits both their effectiveness and their versatility.

The present invention solves this and other problems of the prior an by providing a pedestal clamping mechanism which maintains a substantially constant ratio of vertical to horizontal force component over its entire range of movement during the tightening of the clip and over the range of adjustability of the clip relative to the pedestal.

SUMMARY OF THE INVENTION

The present invention resides in a pedestal-and-clip combination with a clamping mechanism which includes (a) a curved ramp on the pedestal, (b) a follower which engages the curved ramp and is mounted to the pedestal in a movable manner, (c) a clamping element or clip pivotally mounted to the pedestal through the follower, and (d) a lever arm pivotally mounted to the clamping element. The follower engages the curved ramp on one side and a protuberance on the lever arm on the other, the protuberance causing the clip to rotate relative to the follower when the lever arm is rotated. The curvature of the curved ramp is in the vertical plane of the roof rack crossbar, curving from the vertical towards the horizontal as the ramp approaches the crossbar. The combined effect of the curved ramp and the protuberance are that once the clip engages the vehicle and is tightened to the vehicle by lowering the lever arm, the vertical force component exerted on the vehicle by the clip and pedestal together is approximately equal to the horizontal force component, and remains so throughout the range of motion of the lever arm. These forces also remain approximately equal through any adjustments of the length of the clip to accommodate vehicles with different roof curvatures. The result is a secure clamping effect regardless of the roof curvature and with a minimal risk of damage to the roof.

DETAILED DESCRIPTION OF THE INVENTION AND PREFERRED EMBODIMENTS

While the invention encompasses a variety of structures having the characteristics described above, the detailed discussion which follows will focus on a single embodiment of the concepts of the invention for purposes of clarity and understanding. It will be readily apparent to those skilled in the art how the same concepts can be applied to other embodiments.

Figure 1:
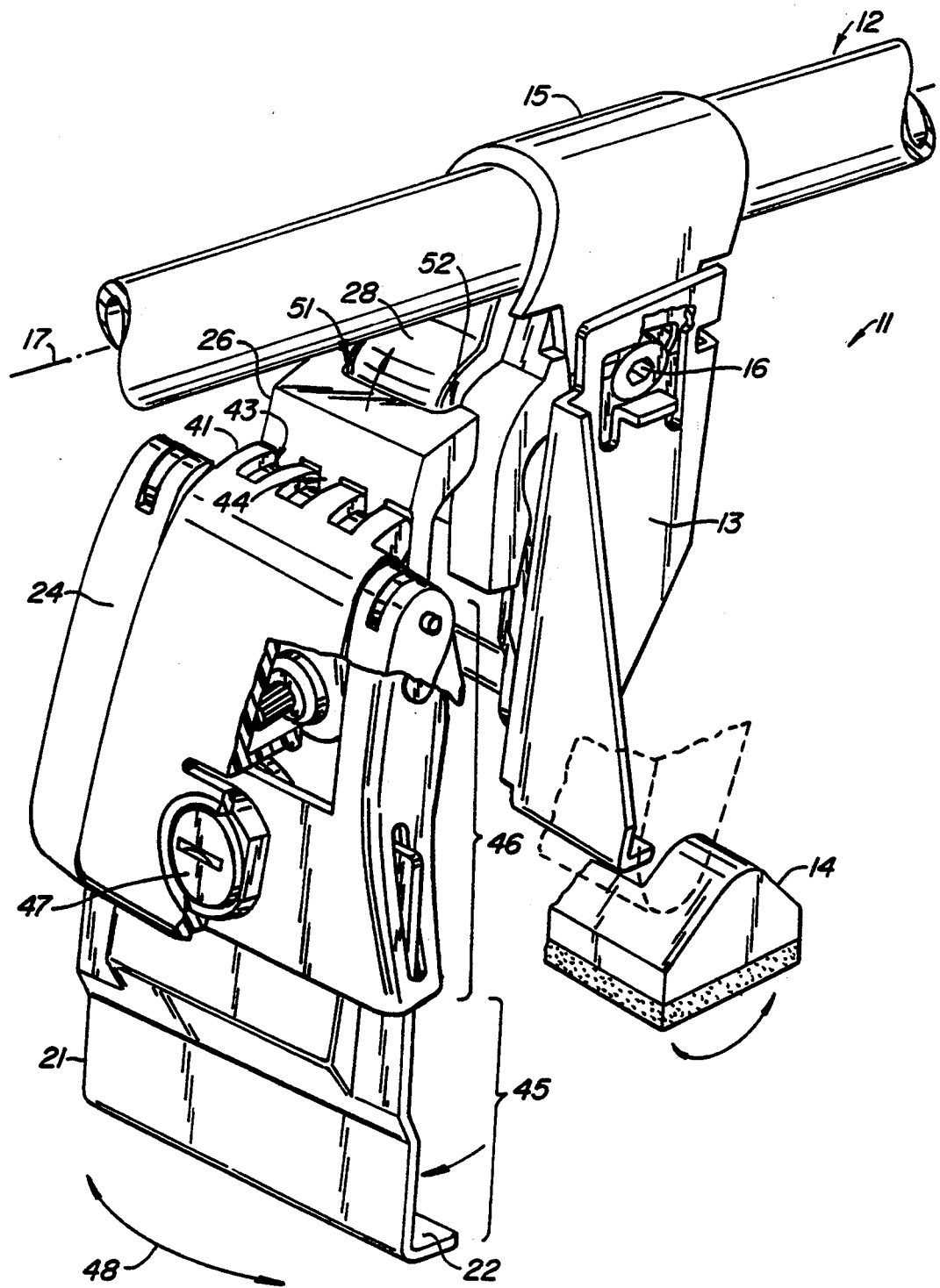
FIG. 1 is a perspective view of one end of a vehicle roof rack which includes an illustrative support structure in accordance with the present invention, with certain parts removed or broken away to show the internal structure.

The perspective view of FIG. 1 shows the support structure 11 of the invention and the crossbar 12 which the support structure, together with an identical support structure at the other side of the crossbar and facing in the opposite direction, supports. The portion of the structure referred to herein as the pedestal 13 is the stationary component of the structure which terminates at the bottom in a base 14 which rests on the vehicle roof, and which terminates at the top in a hood 15 which encircles the crossbar 12. The pedestal includes a tightening mechanism (not shown in this drawing other than by a hexagonal nut 16) which forces the crossbar upward against the internal undersurface of the hood 15. This mechanism is controlled and operated independently of the vehicle clamping mechanism of the present invention which secures the support structure to the vehicle roof. The axis of the crossbar lies along the longitudinal axis 17 of the pedestal 13, which is defined herein as the axis passing through the center of the hood 15.

Figure 2:
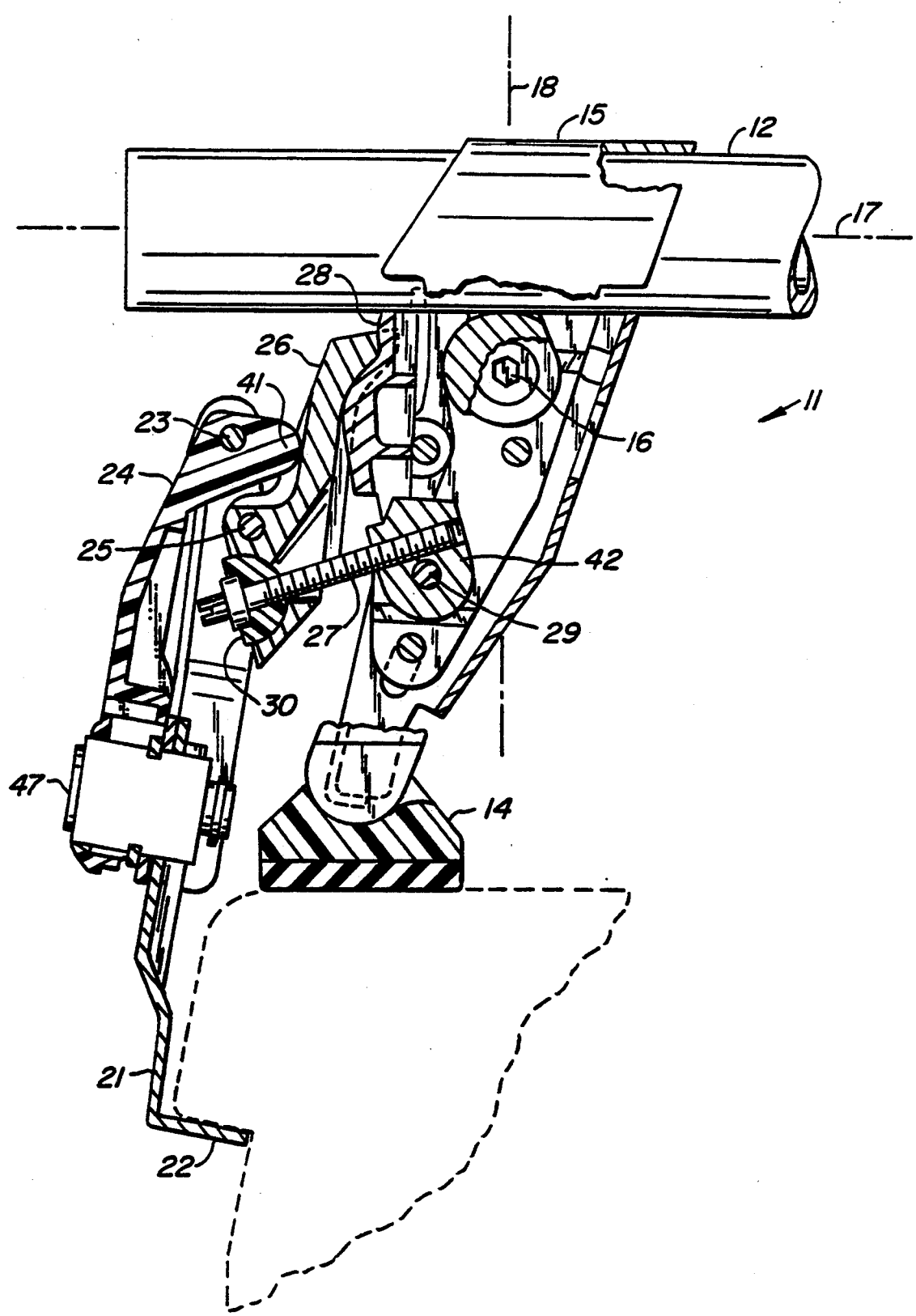
FIG. 2 is a side elevation in cross section of the support structure or FIG. 1.

The support structure has a central plane, which is the plane of the cross section view of FIG. 2, dissecting the pedestal and each of the various components of the vehicle clamping mechanism into two symmetrical halves. The pedestal itself 13 may also be viewed as having a centerline 18 within the dissecting plane, passing through the tightening bolt 16 which clamps the pedestal hood 15 down onto the crossbar 12. It will be noted that the plane of FIG. 2 is defined by the intersection of the centerline 18 and the longitudinal axis 17.

The perspective view of FIG. 1 and the cross section view of FIG. 2 both show the vehicle clamping element or clip 21 which terminates at its lower end in a hook element in the form of a right-angle bend or shoulder 22 which hooks under the door frame or rain gutter of the vehicle. At the upper end of the clip (FIG. 2) are two pivot point connections, one of which 23 joins the clip to the lever arm 24 and the other 25 joins the clip to an element which is referred to herein as a follower 26. The follower 26 in turn is joined to the pedestal 13 through a threaded connecting arm 27, while the upper end of the follower contacts the pedestal at a curved ramp 28 on the pedestal, best seen in the perspective view of FIG. 1. The threaded connecting arm 27 is joined at one end to the pedestal 13 through a pivot connection 29, and at the other through a swivel connection 30. The reasons for, and functions of, all of these connections will become evident from the description which follows.

Figure 3:
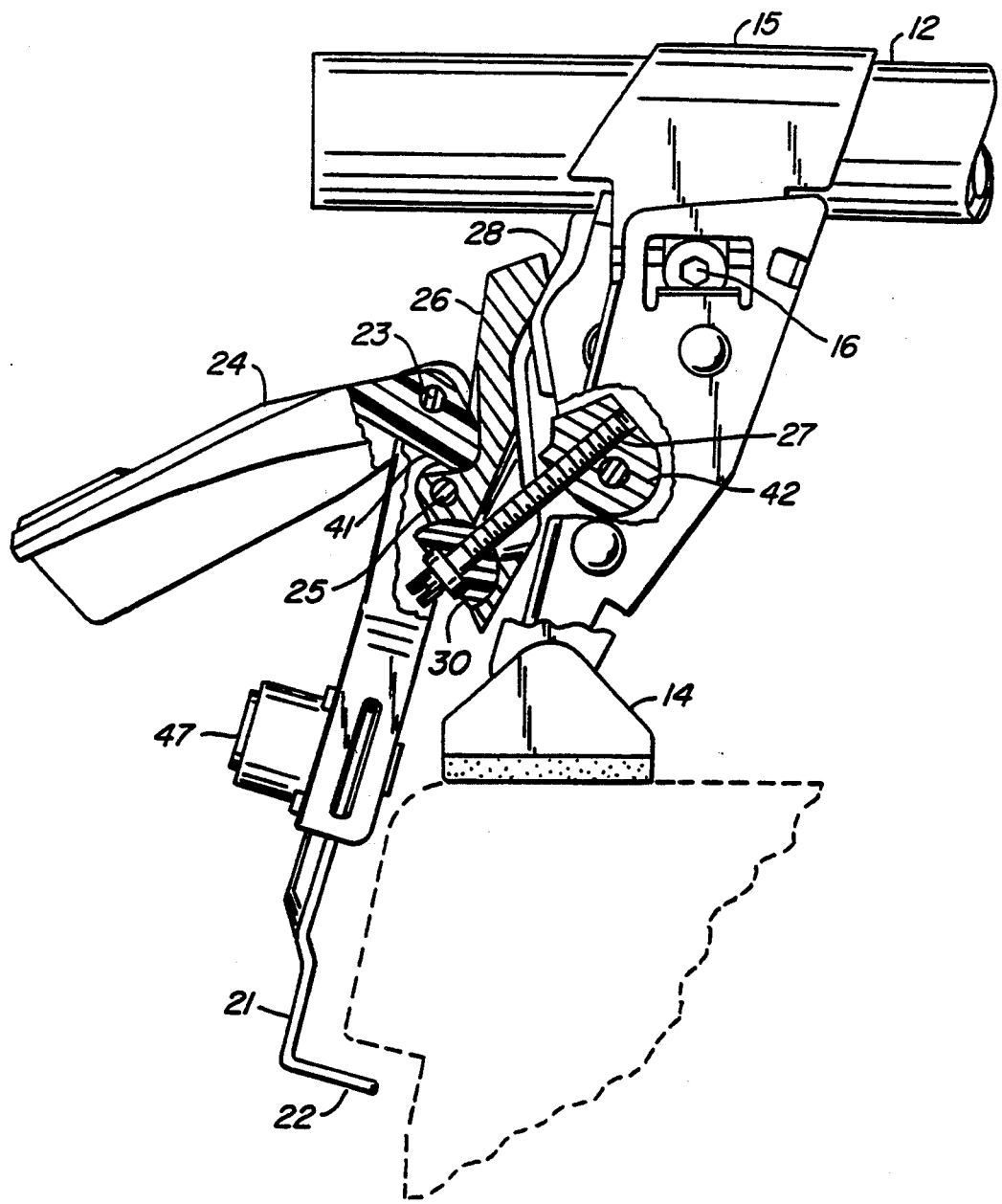
FIG. 3 is a further side elevation of the same support structure in partial cross section, showing the lever arm in a raised position.
Figure 4:
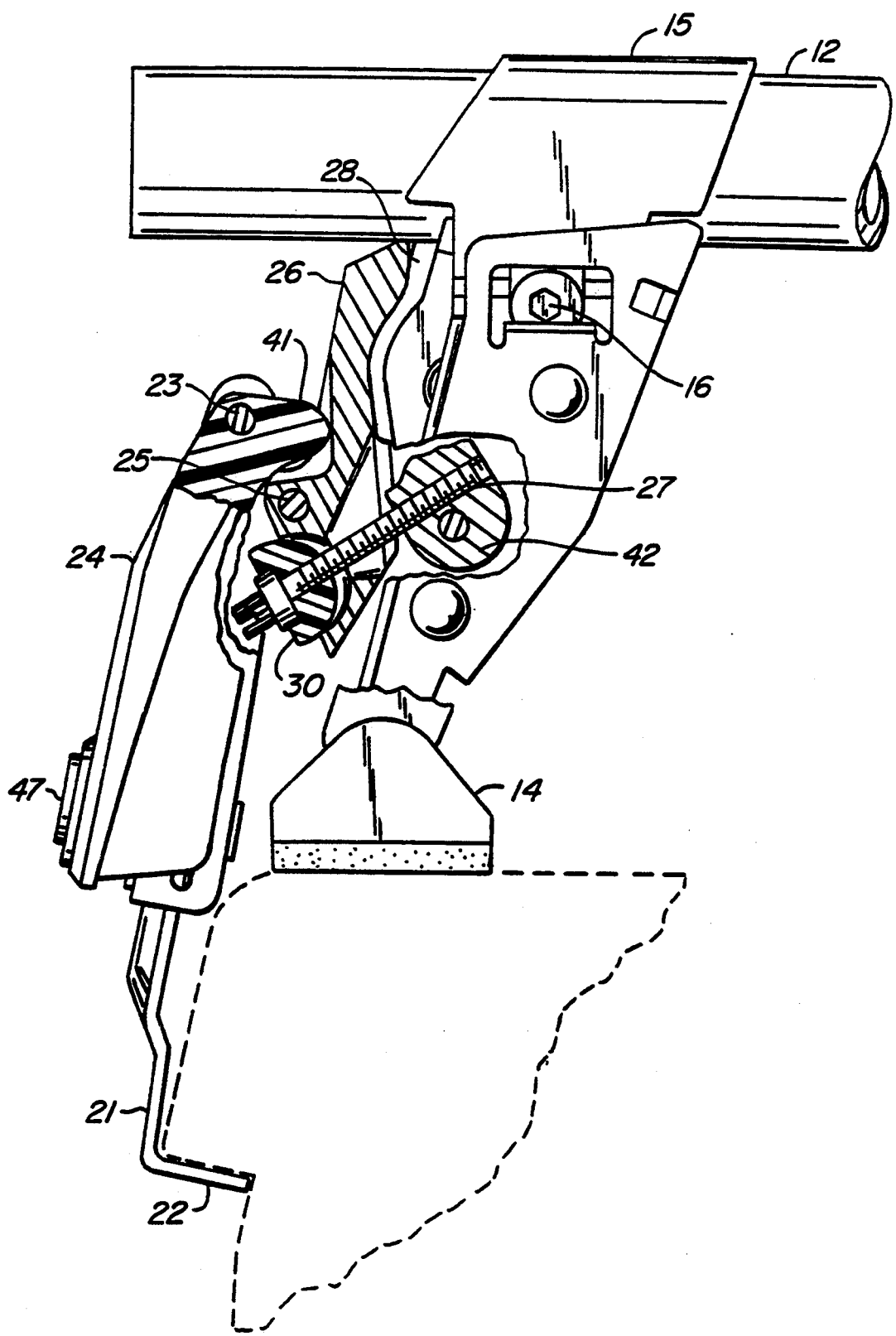
FIG. 4 is a view identical to that of FIG. 3, showing the lever arm in the lowered position.

The raised and lowered positions of the lever arm 24 are shown in FIGS. 3 and 4, respectively, which also show the corresponding positions of the follower 26 and the clip 21. The follower 26 is so termed because it follows the convexly curved path of travel defined by the curved ramp 28. This curved path of travel is within the plane of FIG. 2, and the portion of the curvature over which the follower travels is concave when viewed from above the ramp, i.e., the side contacting the follower.

As the lever arm 24 pivots from the raised position of FIG. 3 to the lowered position of FIG. 4, the follower 26 and clip 21 are both raised, and the clip is rotated slightly in the counterclockwise direction, according to the view shown in these drawings. This rotation is attributable to a protuberance 41 on one side of the lever arm, the protuberance protruding radially outward from the lever arm pivot joint 23. In the raised-lever position shown in FIG. 3, the protuberance 41 forms a slight angle with the line joining the lever arm pivot joint 23 and the pivot joint 25 joining the clip to the follower. As the lever is lowered to the position shown in FIG. 4 (by counterclockwise rotation), the angle between the protuberance 41 and the line joining the two pivot points is increased, the protuberance forcing the follower 26 to the right, with the curvature of the ramp 28 consequently forcing the follower upward. At the same time, the clip 21 is urged upward and its hook 22 inward toward the vehicle.

The horizontal displacement between the clip 21 and the pedestal base 14 are adjustable to accommodate different vehicle roof profiles. With roofs of relatively great slope and a large radius edge curvature, the optimal horizontal spacing between the clip and the pedestal base will be relatively wide. With roofs which are relatively flat with a sharper edge angle, the clip is optimally closer to the pedestal base. This variation is achieved by the threaded connecting arm 27.

The functional length of the threaded connecting arm 27 is variable by turning the arm either by hand or with a suitable tool such as a screw driver. The threads on the arm mate with a threaded hole in the lug 42 which forms the pivot connection 27 between the threaded arm and the pedestal. Assuming a right-hand screw, the functional length of the arm can be extended by turning the arm counterclockwise. This will extend the clip 21 outward, away from the pedestal 13, to accommodate a vehicle roof whose edge has a relatively high degree of curvature, by permitting the base 14 to rest on a portion of the roof further away from the edge so that it can still be angled toward the horizontal. Turning the arm in the opposite direction will shorten the functional length of the arm and bring the arm and pedestal closer together for roofs with more sharply angled edges.

The perspective view of FIG. 1 illustrates certain features of the embodiment which stabilize the clamping force by preventing slippage. The protuberance 41 on the lever arm is formed into alternating grooves and ridges 43 which mate with alternating grooves and ridges 44 on the contact surface of the follower 26. The grooves and ridges 44 on the follower are of sufficient length to mate with the grooves and ridges 43 on the lever arm protuberance over the entire length of contact between the two as the lever arm rotates. This prevents slippage in the transverse direction. Furthermore, the follower 26 is contoured at the site of contact between it and the curved ramp 28 on the pedestal, to curve around the side edges of the ramp. This prevents transverse slippage of the follower relative to the ramp.

Many vehicles have door frames whose upper edges slope relative to the roof surface (i.e., the edges slope in the longitudinal direction of the vehicle). This requires the clip to be at a slight angle relative to the pedestal, this angle being transverse to the plane of FIG. 2. To accommodate this deviation, the structure of the present invention offers two rotational degrees of freedom in this direction. The first results from the clip 21 being formed in two parts, a lower part 45 and an upper part 46, joined by a pivot connection 47 (see FIG. 1). The pivot connection 47 permits the lower part to pivot relative to the upper part in the direction shown by the curved arrow 48. The second rotational degree of freedom resides in the contact area between the follower 26 and the curved ramp 28. As seen in FIG. 1, the contact surface on the follower 26 has a wider curvature than the curved ramp 28, with small gaps 51, 52 at the ends of the curvature. (The curvatures being referred to here are those which are transverse to the dissecting plane of the structure, i.e. , transverse to the plane of FIG. 2.) This permits the follower to be tilted at a slight angle relative to the curved ramp (again, the angle referred to is an angle transverse to the dissecting plane) while still engaging the ramp and avoiding lateral slippage.

A further rotational degree of freedom is the swivel connection which joins the pedestal base 14 to the pedestal 13. This rotation is transverse to the rotation of the two degrees of freedom described in the preceding paragraph, and accommodates the lateral roof curvature of the vehicle. The Figures further show a key-operated lock 47 which can be turned to engage an internal hook on the lever arm 24, thereby holding the lever arm in the lowered position preventing it from being raised.

The foregoing is offered primarily for purposes of illustration. It will be readily apparent to those skilled in the art that the shapes and dimensions of the components as well as other parameters of the structure described herein may be further modified or substituted in various ways without departing from the spirit and scope of the invention.

What is claimed is:

1. A device for securing a support bar to a vehicle roof, said device comprising:
   a pedestal adapted to support a bar along a longitudinal axis, said pedestal having a centerline intersecting said longitudinal axis to define a plane:
   a curved ramp on said pedestal defining a convexly curved path of travel within said plane;
   a follower movably mounted to said pedestal and contacting said curved ramp;
   a clamp member adapted to engage a vehicle door frame, said clamp member pivotally mounted to said follower; and
   a lever arm pivotally mounted to said clamp member and containing a protuberance contacting said follower, whereby rotation of said lever arm to urge said protuberance against said follower causes said follower to pivot relative to said clamp member and to travel along said curved ramp, thereby urging said clamp member toward said longitudinal axis.

2. A device in accordance with claim 1 in which grooves are formed in one of said protuberance and said follower, and ridges complementary to said grooves are formed in the other, to prevent slippage of said lever arm relative to said follower in a direction transverse to said plane.

3. A device in accordance with claim 1 in which said follower has first and second opposing faces, said first face contacting said ramp and said second face containing said protuberance.

4. A device in accordance with claim 1 in which said follower is movably mounted to said pedestal through a swivel connection.

5. A device in accordance with claim 1 in which said follower is movably mounted to said pedestal through a connecting arm of adjustable length, said connecting arm joined to said pedestal with a pivot connection and to said follower with a swivel connection.

6. A device in accordance with claim 1 in which said curved ramp, in addition to defining a curved path of travel within said plane, contains a transverse curvature transverse to said plane.

7. A device in accordance with claim 6 in which said follower contains a contact surface contacting said ramp, said contact surface curved in the direction transverse to said plane.

8. A device in accordance with claim 1 in which said clamp member is comprised of first and second parts, said first part pivotally mounted directly to said follower, and said second part terminating in a hook to engage said vehicle door frame, said first and second parts joined by a pivot connection permitting pivoting of said first and second parts relative to each other within a plane transverse to said longitudinal axis.

* * * * *